United States Patent
Nayyar et al.

(10) Patent No.: US 7,898,475 B2
(45) Date of Patent: Mar. 1, 2011

(54) GNSS RECEIVER WITH REDUCED STORAGE REQUIREMENTS

(75) Inventors: Jasbir Singh Nayyar, Ludhiana (IN); Sreenath Narayanan Potty, Trivandrum (IN)

(73) Assignee: Texas Instruments Incorporated, Dallas, TX (US)

( * ) Notice: Subject to any disclaimer, the term of this patent is extended or adjusted under 35 U.S.C. 154(b) by 180 days.

(21) Appl. No.: 12/391,244

(22) Filed: Feb. 23, 2009

(65) Prior Publication Data

US 2009/0213006 A1    Aug. 27, 2009

(30) Foreign Application Priority Data

Feb. 21, 2008  (IN) .......................... 439/CHE/2008
Feb. 27, 2008  (IN) .......................... 487/CHE/2008

(51) Int. Cl.
   *G01S 19/35*  (2010.01)
   *G01S 19/37*  (2010.01)

(52) U.S. Cl. .............................. 342/357.75; 342/357.77

(58) Field of Classification Search ............ 342/357.75, 342/357.77
See application file for complete search history.

(56) References Cited

U.S. PATENT DOCUMENTS

2008/0232514 A1 *   9/2008   Huang ....................... 375/343

* cited by examiner

*Primary Examiner* — Thomas H Tarcza
*Assistant Examiner* — Harry Liu
(74) *Attorney, Agent, or Firm* — Ronald O. Neerings; Wade James Brady, III; Frederick J. Telecky, Jr.

(57) ABSTRACT

A Global Navigation Satellite System (GNSS) receiver provided according to an aspect of the present invention contains a buffer to store less than a number of samples spanning a code period of a received GNSS signal, with the samples being used by a correlator and a processor to perform various searches in the receiver. Due to the use of such smaller memory space in the buffer, the overall size of receivers may be reduced. According to another aspect of the present invention, the amount of storage provided for storing local code and carrier samples (used during correlation) is also reduced by dynamically generating the local code and carrier sample as required for generating partial correlation results.

19 Claims, 8 Drawing Sheets

| SHIFT | T0 | T1 | T2 | T3 | T4 | T5 | T6 | T7 |
|---|---|---|---|---|---|---|---|---|
| 0 | I1C1F11+I2C2F12 | I1C1F21+I2C2F22 | | | | | | |
| 1 | I1C2F11+I2C3F12 | I1C2F21+I2C3F22 | | | | | | |
| 2 | I1C3F11+I2C4F12 | I1C3F21+I2C4F22 | I3C3F13+I4C4F14 | I3C3F23+I4C4F24 | | | | |
| 3 | I1C4F11+I2C5F12 | I1C4F21+I2C5F22 | I3C4F13+I4C5F14 | I3C4F23+I4C5F24 | | | | |
| 4 | I1C5F11+I2C6F12 | I1C5F21+I2C6F22 | I3C5F13+I4C6F14 | I3C5F23+I4C6F24 | I5C5F15+I6C6F16 | I5C5F25+I6C6F26 | | |
| 5 | I1C6F11+I2C7F12 | I1C6F21+I2C7F22 | I3C6F13+I4C7F14 | I3C6F23+I4C7F24 | I5C6F15+I6C7F16 | I5C6F25+I6C7F26 | | |
| 6 | I1C7F11+I2C8F12 | I1C7F21+I2C8F22 | I3C7F13+I4C8F14 | I3C7F23+I4C8F24 | I5C7F15+I6C8F16 | I5C7F25+I6C8F26 | I7C7F17+I8C8F18 | I7C7F27+I8C8F28 |
| 7 | I1C8F11+I2C1F12 | I1C8F21+I2C1F22 | I3C8F13+I4C1F14 | I3C8F23+I4C1F24 | I5C8F15+I6C1F16 | I5C8F25+I6C1F26 | I7C8F17+I8C1F18 | I7C8F27+I8C1F28 |
| 8 | | | I3C1F13+I4C2F14 | I3C1F23+I4C2F24 | I5C1F15+I6C2F16 | I5C1F25+I6C2F26 | I7C1F17+I8C2F18 | I7C1F27+I8C2F28 |
| 9 | | | I3C2F13+I4C3F14 | I3C2F23+I4C3F24 | I5C2F15+I6C3F16 | I5C2F25+I6C3F26 | I7C2F17+I8C3F18 | I7C2F27+I8C3F28 |
| 10 | | | | | I5C3F15+I6C4F16 | I5C3F25+I6C4F26 | I7C3F17+I8C4F18 | I7C3F27+I8C4F28 |
| 11 | | | | | I5C4F15+I6C5F16 | I5C4F25+I6C5F26 | I7C4F17+I8C5F18 | I7C4F27+I8C5F28 |
| 12 | | | | | | | I7C5F17+I8C6F18 | I7C5F27+I8C6F28 |
| 13 | | | | | | | I7C6F17+I8C7F18 | I7C6F27+I8C7F28 |

*FIG. 6*

GNSS RECEIVER WITH REDUCED STORAGE REQUIREMENTS

RELATED APPLICATIONS

The present application claims the benefit of the following two co-pending India provisional applications, both of which are incorporated in their entirety herewith:

Serial number: 439/CHE/2008, entitled: "Area & Performance Optimized Architecture for GPS Acquisition/Tracking correlator Channel", filed on 21 Feb. 2008, naming Texas Instruments Inc. (the intended assignee) as the Applicant, and naming Jasbir Singh Nayyar as inventor.

Serial number: 487/CHE/2008, entitled: "Area & Performance Optimized Architecture for GNSS Acquisition/Tracking Channel", filed on 27 Feb. 2008, naming Texas Instruments Inc. (the intended assignee) as the Applicant, and naming Jasbir Singh Nayyar as inventor.

BACKGROUND OF THE INVENTION

1. Technical Field

Embodiments of the present disclosure relate generally to navigation system receivers, and more specifically to a Global Navigation Satellite System (GNSS) receiver with reduced storage requirements.

2. Related Art

GNSS generally refers to any of the satellite-based navigation systems, which broadcast GNSS signals carrying data (e.g., satellite position, time-of-transmission, various correction parameters, etc.) used by corresponding receivers to determine their respective positions based on the received broadcast data. Global Positioning System (GPS) and Galileo based Systems are some examples of GNSS.

It is generally desirable that a GNSS receiver be designed with reduced storage requirements, at least for reasons such as lower implementation cost and area, lower power consumption, etc.

SUMMARY

This Summary is provided to comply with 37 C.F.R. §1.73, requiring a summary of the invention briefly indicating the nature and substance of the invention. It is submitted with the understanding that it will not be used to interpret or limit the scope or meaning of the claims.

A Global Navigation Satellite System (GNSS) receiver provided according to an aspect of the present invention contains a buffer to store fewer than a number of samples spanning a code period of a received GNSS signal, with the samples being used by a correlator and a processor to perform various searches in the receiver. Due to the use of such smaller memory space in the buffer, the overall size of receivers may be reduced.

According to another aspect of the present invention, the amount of storage provided for storing local code and carrier samples (used during correlation) is also reduced by dynamically generating the partial values of the local code and carrier sample as required for generating partial correlation results. The overall size of receivers may be reduced due to such a feature also.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the features of the invention.

BRIEF DESCRIPTION OF THE VIEWS OF DRAWINGS

Example embodiments of the present invention will be described with reference to the accompanying drawings briefly described below.

FIG. 6 is a diagram of a table containing partial sums generated in a channel in an embodiment.

The drawing in which an element first appears is indicated by the leftmost digit(s) in the corresponding reference number.

DETAILED DESCRIPTION

Various embodiments are described below with several examples for illustration.

1. Example Environment

Figure 1:
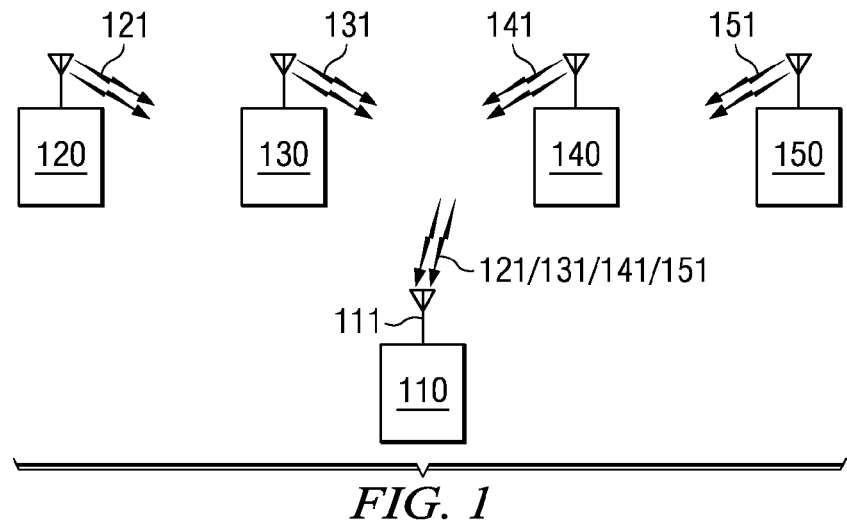
FIG. 1 is a block diagram of an example environment in which several aspects of the present invention can be implemented.

FIG. 1 is a block diagram of an example environment in which several aspects of the present invention can be implemented. The diagram is shown containing GNSS receiver 110, and GNSS transmitters 120, 130, 140 and 150. Merely for illustration, the components of FIG. 1 are assumed to correspond to a satellite-based navigation system such as GPS, Galileo, and GLONASS systems. However, several of the features can be implemented in other GNSS environments, as well as in environments in which multiple GNSS systems are used in combination (e.g., GPS plus Galileo), as will be apparent to one skilled in the relevant arts by reading the disclosure provided herein. Similarly, merely for illustration, the environment is chosen to contain fewer transmitters, etc., though several real-world environments contain many more devices, both in type and number.

Assuming a satellite-based navigation system environment, each of GNSS transmitters 120, 130, 140 and 150 corresponds to a satellite transmitting a corresponding GNSS signal containing information (data values) that enables GNSS receiver 110 to determine its position. Only four GNSS transmitters and one receiver are shown for simplicity. However, typically many more transmitters and receivers may be present in corresponding environments. GNSS transmitters 120, 130, 140 and 150 respectively transmit GNSS signals 121, 131, 141, and 151.

GNSS receiver 110 receives signals 121, 131, 141 and 151 (via antenna 111), and determines its position (typically in a Cartesian coordinate system, or as latitude, longitude and height with respect to the earth's surface) in a manner well known in the relevant arts, once the data values from the received signals are recovered. For ease of description signals 121, 131, 141 and 151 are together referred to as signal 111.

Several features of the present invention enable GNSS receiver 110 to be implemented with smaller area and resource requirements (e.g., smaller buffer memory). The features can be better appreciated based on an understanding of the structure of the signal received at antenna 111. Accordingly, the description is continued with respect to an example signal structure of a transmitted GNSS signal (e.g., any of 121, 131, 141 and 151).

2. Example Signal Structure

Figure 2:
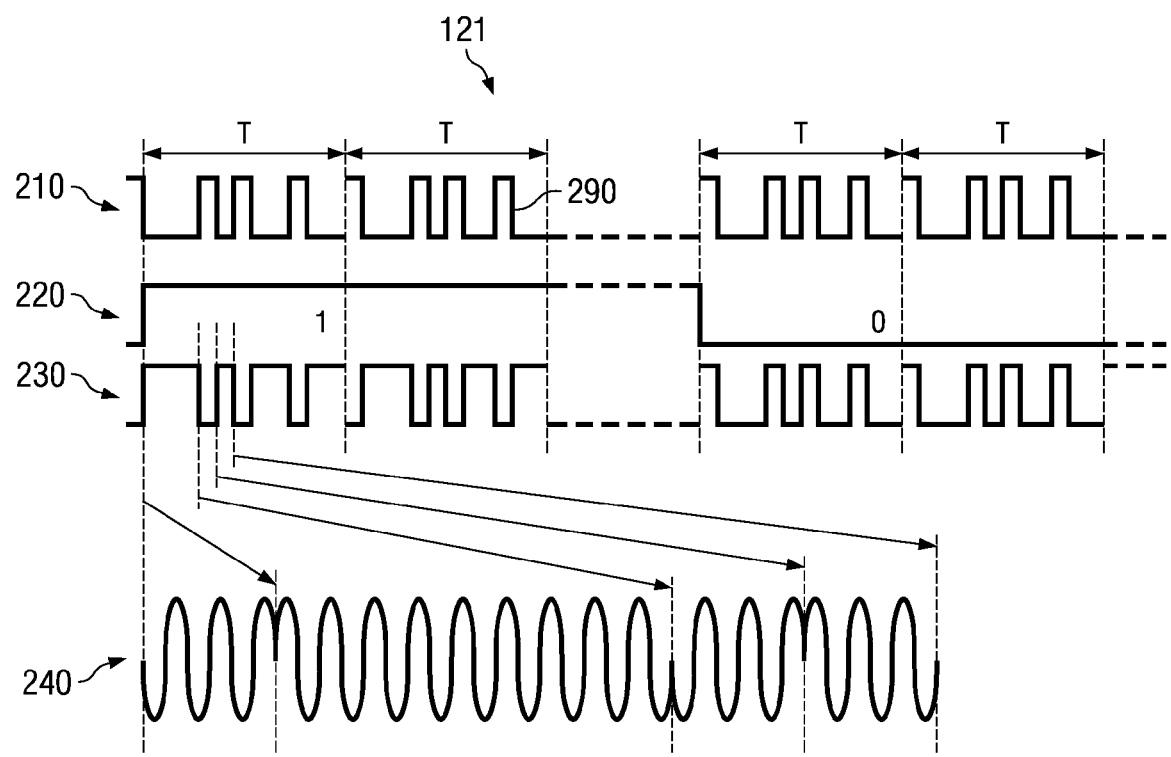
FIG. 2 is a diagram illustrating an example signal structure of an example GNSS signal.

FIG. 2 is a diagram illustrating an example signal structure of a GNSS signal (either transmitted by transmitter 120 or received at antenna 111). It may be noted that the specific details of the signal may be different from that shown in FIG. 2, based on the specific type of GNSS signal. The diagram shows details of signal 121 though the description is applicable to other signals 131, 141, and 151 as well. It should be appreciated that waveform 240 is shown on an 'expanded' time scale (for clarity) and the inter-relation of specific portions is illustrated by arrows.

Waveform 210 represents a spreading code used to spread the bandwidth occupied by the data (220) to a much wider bandwidth according to direct sequence spread spectrum technology. As is well known, each transmitter 120/130/140/150 uses a corresponding different code. Waveform 210 is shown containing multiple code bits in each code period T, and may be a pseudo random binary (PRN) sequence. The code is shown as the sequence 10010100100 merely for illustration.

Waveform 220 contains data values (with each value containing potentially several bits) representing information that enables GNSS receiver 110 to determine its (receiver's) position, and may include the position of satellite 120, orbital information of satellite 120, clock information, various correction parameters, etc., as is well known in the relevant arts. A single data bit of a GNSS signal can span one or more code periods, and the corresponding duration is referred to as a data bit period. The time-relationship between a data-bit period and code period may be different for different GNSS systems.

Data 220 and code 210 are combined to generate waveform 230. In the context of GPS GNSS system, data 220 and code 210 are combined using an exclusive-OR (XOR) operation to generate waveform 230, as shown with example code and data portions in FIG. 2. Each bit (or symbol, in general) of waveforms 210 and 230 is also referred to as a chip. Chip 290 is marked in FIG. 2 as an illustration. However, alternative combining techniques can be used to generate the combined value, as will be apparent to one skilled in the relevant arts by reading the disclosure provided herein. Further, in non-GPS contexts such as Galileo System, such combination may be performed in a different manner.

Waveform 230 modulates a carrier of a predetermined frequency, and an example modulated carrier (GNSS signal) is represented by waveform 240. With respect to GNSS signal 240, it is assumed that BPSK modulation is used (though other techniques can be used, without departing from the scope and spirit of various aspects of the present invention) to modulate the carrier, as may be observed from waveform 240, only a portion of which is shown. It is noted that in FIG. 2, only three carrier cycles are shown corresponding to one code bit period. However, typically the number of carrier cycles in one code bit period is much larger.

As is well known in the relevant arts, GNSS signals 121, 131, 141 and 151 may each represent a different code, but on a same carrier frequency for a same GNSS system. Thus, all transmitters of GPS would transmit on one frequency, while all transmitters of Galileo system would transmit on some other frequency. GNSS receiver 110 extracts data 220 from a GNSS signal 121 by generating a local signal (which is formed by combining a replica of code 210 and the carrier in a similar manner as in GNSS transmitter 120), and performing correlation operations with the generated local signal with signal 121 (or a down-converted baseband signal corresponding to signal 121). GNSS receiver 110 extracts data from signals 131, 141 and 151 in a correspondingly similar manner.

3. Example Receiver

Figure 3:
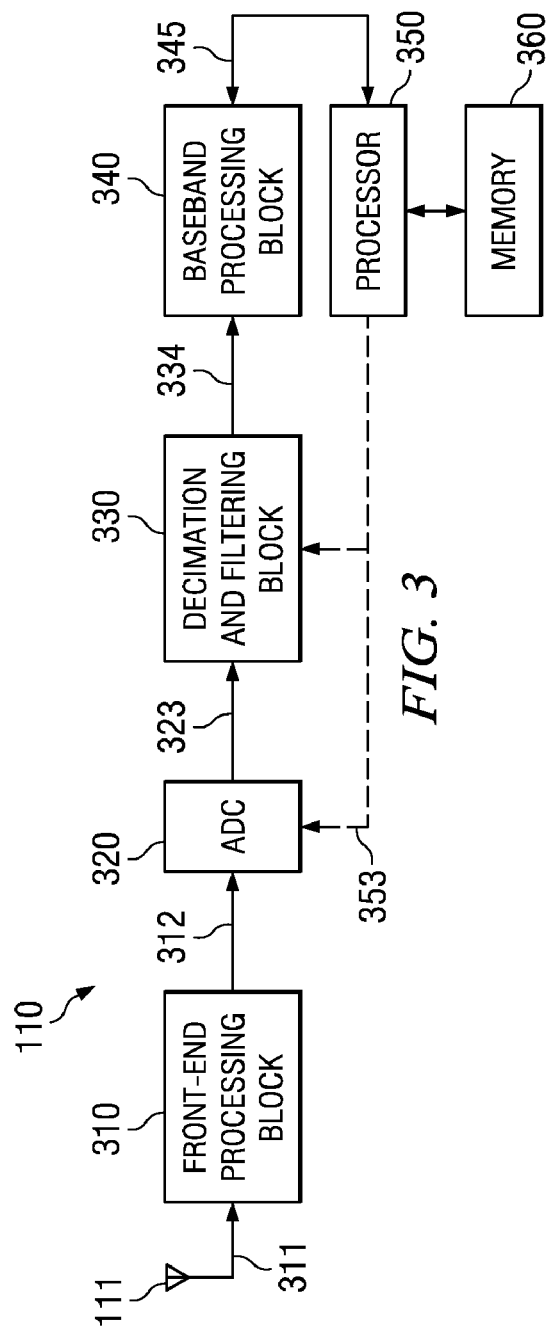
FIG. 3 is a block diagram of a GNSS receiver in an embodiment of the present invention.

FIG. 3 is a block diagram illustrating the details of a GNSS receiver in an embodiment. GNSS receiver 110 is shown containing antenna 111, front-end processing block 310, analog to digital converter (ADC) 320, decimation and filtering block 330, baseband processing block 340, processor 350, and memory 360. The details of the diagram are provided merely by way of illustration, and other embodiments may contain fewer or more components, and corresponding interconnections.

Antenna 111 receives GNSS signals 121, 131, 141 and 151, and provides the signals on path 311 to front-end processing block 310. The combination of all the GNSS signals provided by antenna 111 to front-end processing block 310 is also referred to in this application as "received GNSS signal". Thus, "received GNSS signal" at antenna 111 may contain multiple types of GNSS signals (GPS, Galileo, etc), as well as multiple numbers of each type from corresponding transmitters.

Front-end processing block 310 may perform various front-end analog signal processing operations, such as bandpass filtering, amplification using a low-noise amplifier etc., on the received GNSS signal. Front end processing block 310 may also perform one or more levels of down-conversion to lower the carrier frequency to a lower frequency (e.g., intermediate frequency/IF). Front end processing block 310 provides the processed signal (e.g., IF signal) to ADC 320 via path 312. The operations as well as components within front-end processing block 310 may be designed to operate with CDMA (code division multiple access, e.g., GPS, Galileo) as well as FDM (Frequency division multiplexed, E.g., GLO-NASS) type of GNSS signals.

ADC 320 samples signal 312 to generate corresponding digital codes/samples. The sampling rate may be selected to be sufficiently high such that code and data information in the IF signal is preserved. ADC 320 provides the samples to decimation and filtering block 330 on path 323. In some embodiments, decimation and filtering block 330 may not be implemented, and ADC 320 may provide the samples directly to baseband processing block 340.

Decimation and filtering block 330 performs various operations on the samples received on path 323 to further reduce (down-convert) the IF frequency to baseband. Thus, decimation and filtering block 330 provides the final down-converted signal at baseband to baseband processing block 340. In some embodiments, decimation and filtering block 330 may also operate to remove a common carrier Doppler component (common to all transmitted GNSS signals caused, for example, by a frequency offset/variation in a master clock used to generate local signals in receiver 110, for example, in baseband processing block 340). Decimation and filtering block 330 provides samples corresponding to the final down-converted signal (referred to also as the baseband GNSS signal) to baseband processing block 340 on path 334.

Decimation and filtering block 330 may be implemented to provide different decimation rates for different types of GNSS signals (GPS, Galileo System, etc), and may correspondingly provide samples at different desired rates on path 334 (which may thus contain multiple paths). As an illustration, ADC 320 may sample signal 312 at a frequency of 'S' samples per second. Based on the specific type of GNSS signal to be processed, as well as the specific type of processing (whether a GNSS signal is being acquired or tracked), decimation and filtering block may be implemented to cause only a fraction of the samples (e.g., every other sample) to be forwarded on path 334. ADC 320 and decimation and filtering block 330 may (optionally) receive control signals via path 353 from processor 350 to set various parameters (e.g., decimation rate, sampling rate, etc.) related to their operations.

Baseband processing block 340 generates local signals corresponding to each transmitted GNSS signal, and correlates the received GNSS signal with each of the local signals to acquire (lock onto) and track (to maintain lock) the transmitted GNSS signals. Each local signal is a carrier signal modulated by a corresponding spreading code. The frequency of the locally generated carrier may be at baseband (approximately equal to the carrier frequency of a signal on path 334). Baseband processing block 340 provides results (typically a number representing the degree of similarity of the corresponding local and transmitted GNSS signal) of correlation operations to processor 350 via path 345. Baseband processing block 340 may receive operational commands, initialization commands and data, clocks, etc., from processor 350 via path 345.

As is well known, acquisition of a GNSS signal typically involves various searches/operations such as code phase searches and carrier Doppler searches. A code phase search implies aligning the spreading code of a GNSS signal with a locally generated replica code in receiver 110. A Doppler search is directed to (precise) determination of the carrier frequency of a baseband GNSS signal accounting for frequency changes due to Doppler effects. While the applicable standards specify a nominal carrier frequency, the actual frequency with which a GNSS signal is received can deviate from the nominal due to Doppler effect caused by relative motion between a GNSS receiver and a satellite. Once a signal is acquired, tracking may also require adjustments to local code and carrier phases and/or frequencies.

Hence, baseband processing block 340 performs code phase searches and carrier Doppler searches corresponding to each GNSS signal (e.g., for each of signals 121, 131, 141 and 151 shown in FIG. 1). The local signal corresponding to each iteration may potentially contain a different carrier frequency and/or code phase, and is generated to correspond to a desired GNSS signal that is to be acquired and tracked. A detailed description of signal acquisition and tracking is not provided here in the interest of conciseness, and any of several well known techniques may be employed.

Processor 350 processes the correlation results received via path 345 from baseband processing block 340 to control the various acquisition/tracking operations, to extract the data transmitted by the satellites, to estimate the time taken for the signal to reach receiver 110, among various other operations, to determine the position of GNSS receiver 110 according to any of several known techniques. Processor 350 may correspond to a general purpose processor or to an application specific processor such as a digital signal processor (DSP).

Several features of the present invention enable baseband processing block 340 to be implemented with smaller storage requirements, and hence with smaller area. An embodiment is described in detail next.

4. Baseband Processing Block with Smaller Storage Area

Figure 4:
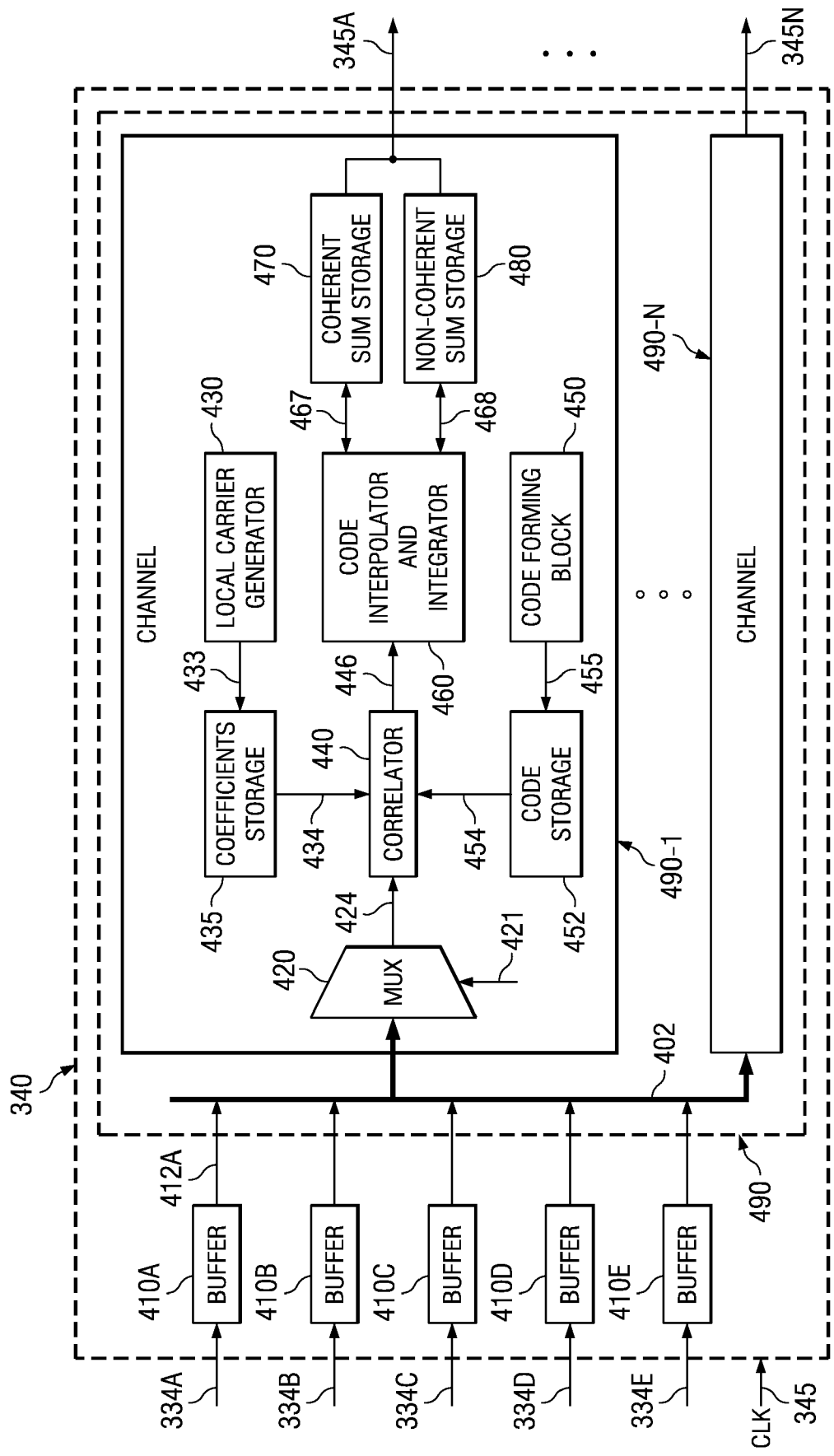
FIG. 4 is a block diagram of a baseband processing block in an embodiment.

FIG. 4 is a block diagram of a baseband processing block in an embodiment. Baseband processing block 340 is shown containing buffers 410A, 410B, 410C, 410D and 410E, and N-channel correlation block (490) containing channels 490-1 through 490-N, and bus 402. The internal details of only channel 490-1 is shown, and channels 490-2 through 490-N may be implemented in a similar manner. GNSS samples stored in the buffers is available for processing (by selection in the corresponding multiplexer) to each of the channels. Thus, each of the buffers 410A through 410E may be viewed as being 'common' to all the channels. Each channel may be selected to acquire/track a different GNSS signal (e.g., a GPS signal with specific code, Galileo signal), though multiple channels can be operated to process a same GNSS signal.

Channel 490-1 is shown containing multiplexer (MUX) 420, local carrier generator 430, coefficients storage 435, correlator 440, code forming block 450, code storage 452, code interpolator and integrator 460, coherent sum storage 470 and non-coherent sum storage 480. The operations of the various blocks of baseband processing block 340 may be controlled by (synchronized with) clock 345Clk, provided by processor 350. While shown in FIG. 4 as containing five buffers (410A, 410B, 410C, 410D and 410E), baseband processing block 340 can be implemented with fewer or more buffers.

Paths 334A, 334B, 334C, 334D, and 334E are deemed to be contained in path 334 of FIG. 3. Buffers 410A, 410B, 410C, 410D and 410E receive a respective sequence of samples representing received GNSS signal 111 (being the combination of signals 121, 131, 141 and 151) on respective paths 334A, 334B, 334C, 334D and 334E. The sequences on the paths may correspond to samples at different rates. In an embodiment, buffer 410A receives samples with a sampling rate of 2 samples per symbol (sps), and the samples may be used by one or more channels (490-1 through 490-N) during acquisition phase of corresponding GPS signals.

Buffer 410B receives samples with a sampling rate of 4 sps, and the samples may be used by one or more channels (490-1 through 490-N) during tracking phase of corresponding GPS signals. Buffers 410C, 410D and 410E respectively receive samples with sampling rates of 1 sps, 1 sps and 4 sps, and used respectively for acquisition of upper side band of Galileo signal, acquisition of lower side band of Galileo signals, and for tracking of Galileo signals. Samples in each of buffers 410A, 410B, 410C, 410D and 410E are provided to multiplexers in channels 490-1 through 490-N via bus 402. The paths from each of the buffers to bus 402 may be serial or parallel (multiple paths from each storage location of the buffers to bus 402).

Each of channels 490-1 through 490-N operates to acquire and track a corresponding GNSS signal, as specified, for example by processor 350. For example, channel 490-1 may be used to acquire and track signal 121 transmitted by satellite 120 (by using the same code as that used by satellite 120 and a local carrier), while channel 490-2 may be used in relation to signal 131 (by using the code used by satellite 130 and a local carrier), etc. Channels 490-3 through 490-N may similarly be used to acquire and track other GNSS signals (of other navigational systems). Alternatively, multiple correlators may be used for correlation with a same GNSS signal at least for small durations of operation. In general, the specific code (spreading code) and local carrier frequency used in a channel determines the specific transmitted GNSS signal that is searched for or tracked.

MUX 420 receives a control signal on path 421 (contained in path 345 of FIG. 3), for example, from processor 350 (FIG. 3), and forwards samples on path 424 from a selected one of buffers 410A, 410B, 410C, 410D and 410E to correlator 440. Thus, processor 350 may control the specific combination of mode (for example, acquisition vs. tracking)-navigational system (for example, GPS vs. Galileo) by controlling MUX-control-input 421 for the corresponding channel. The specific GNSS signal (121 vs. 131 vs. 141, etc., of FIG. 1) being searched for, may be controlled by controlling the appropriate values in code forming block 450.

Local carrier generator 430 stores (via path 433) digital samples (termed Doppler coefficients) representing a local carrier signal in coefficients storage 435. The Doppler coefficients may be generated using well-known techniques, such as for example, using phase accumulator techniques. The local carrier signal approximately equals the carrier frequency of the baseband GNSS signal that channel 490-1 is selected for acquiring/tracking. As is well known in the relevant arts, the difference in the carrier frequencies between the locally generated carrier and the carrier of a baseband GNSS signal may be due to Doppler effects caused by relative motion between receiver 110 and the transmitting satellites (FIG. 1), ignoring offsets and drifts in the time-base generators (master clocks) in the satellites and receiver 110.

Code forming block 450 provides, on path 455, a local code (in the form of corresponding digital samples) corresponding to the specific GNSS signal that is desired to be processed. Code forming block 450 contains circuitry for generating the code samples (e.g., using Linear Feedback Shift Registers), as well as storage elements for storing the generated local code chip samples. Code storage 452 stores the code chips/bits received on path 455. In an embodiment, all code bits and all Doppler coefficients required for processing are generated and stored (in code storage 452 and coefficients storage 435 respectively) prior to commencement of processing of the GNSS signal, for example, at the time of initialization of a channel, to process a specific GNSS signal.

Correlator 440 combines the local code and local carrier samples received on paths 454 and 434 respectively to generate a local signal. Correlator 440 correlates the local signal with the baseband GNSS signal received on path 424, for example, by multiplying corresponding samples of the baseband GNSS signal and the local signal. Correlator 440 provides the product on path 446.

Code interpolator and integrator 460 performs coherent and/or non-coherent addition (digital integration) of the correlation products received on path 446 to generate a sum, which is forwarded for storage either on path 467 to coherent sum storage 470 or on path 468 to non-coherent sum storage 480 based on whether coherent integrations or non-coherent integrations are performed in channel 490-1. Code interpolator and integrator 460 also removes code Doppler (Doppler effects on code samples of the GNSS signal). Coherent sum storage 470 and non-coherent sum storage 480 are storage components such as, for example, random access memory (RAM), flash memory, etc. Processor 350 retrieves the multiplied-and-accumulated sums in coherent sum storage 470 and/or non-coherent sum storage 480 (via path 345A), and partial sums from storage elements in the other channels (channel 490-N and retrieval path 345N are shown), and processes the sums to determine the position of receiver 110, universal coordinated time (UTC), etc., using techniques well known in the relevant arts.

In an approach described in co-pending application entitled, "Doppler And Code Phase Searches In A GNSS Receiver", naming Jasbir Singh Nayyar as inventor, Ser. No. 12/045,047, filed on: 10 Mar. 2008, which is incorporated in its entirety into the present application, buffers to store GNSS samples are implemented with a storage size of at least one code period worth of samples of the corresponding type of GNSS signal. However, such an approach may not be efficient in terms of implementation area and cost. Further, with such an approach, larger buffer sizes may be required when the code period is longer (more number of symbols/chips in a code period). Hence, the storage area may increase proportionately with respect to code period length. Another potential drawback with the above-noted approach is that for higher sampling rates (generally required for more precise determination of position, such as during a tracking phase), the buffer sizes further increase. Also, for better performance (accuracy, sensitivity and TTFF—time to first fix), the GNSS samples may need to be represented using multiple bits, which further increases the storage requirements The buffer size/area requirement may become even larger if such buffers need to be replicated for each channel.

According to an aspect of the present invention, each of buffers 410A, 410B, 410C, 410D and 410E is implemented to have a storage size less than the number of samples generated corresponding to one code period of corresponding GNSS signal, and are thus designed to store fewer than a number of samples spanning one code period of a GNSS signal. To illustrate and clarify, assuming buffer 410A is implemented to store samples of GPS type of GNSS signal (one code period of a GPS L1 C/A signal containing 1023 chips), its storage size is less than the number of samples generated corresponding to 1023 chips.

In an embodiment, two samples are generated (by decimation and filtering block 330) per chip of a GPS signal, and hence 2046 samples would be generated corresponding to one code period. The storage size of buffer 410A is implemented with a memory capacity to store less than 2046 samples in this example.

New 'incoming' samples of a GPS signal are sequentially (serially) stored in buffer 410A, overwriting the 'old' samples. Buffer 410A may thus be viewed as a shift register with 'new' incoming samples being 'shifted-in', while older (in time) samples are shifted out (and discarded). All of channels 4901-1 through 4901-N selected to process the samples in buffer 410A receive the samples stored in buffer 410A. Thus, in addition to a storage size less than 'one code period worth', the same buffer (410A) provides samples to all channels that are selected to process the samples.

Each of the other buffers (410B, 410C, 410D and 410E) is implemented similarly with a size less than "one code period worth samples" of the corresponding GNSS signals to be stored in the buffers, and also provide the stored samples to all the channels selected to process the corresponding samples.

Thus, in the embodiment illustrated with respect to FIG. 4, buffer 410B has a storage size less than 4096 samples (corresponding to GPS signal sampled at 4 sps). Buffer 410C has a storage size less than 4096 samples (corresponding to USB of Galileo signal sampled at 1 sps). Buffer 410D has a storage size less than 4096 samples (corresponding to LSB of Galileo signal sampled at 1 sps). Buffer 410E has a storage size less than 16384 samples (corresponding to Galileo signal, USB plus LSB, sampled at 4 sps). It may, therefore, be appreciated that the buffer implementation described above reduces overall storage requirements in baseband processing block 340 (receiver 110 in general), and thus the implementation area. In addition, processing of GNSS signals with large code period lengths, as well as sample-generation of GNSS samples with higher sampling rates may be efficiently accommodated without substantial increase in implementation area. Further, since the data in the buffers are available to all the channels, implementation area is further reduced. An example description of the operation of a channel using a storage buffer implemented as described above is provided next.

5. Operation

Figure 5A:
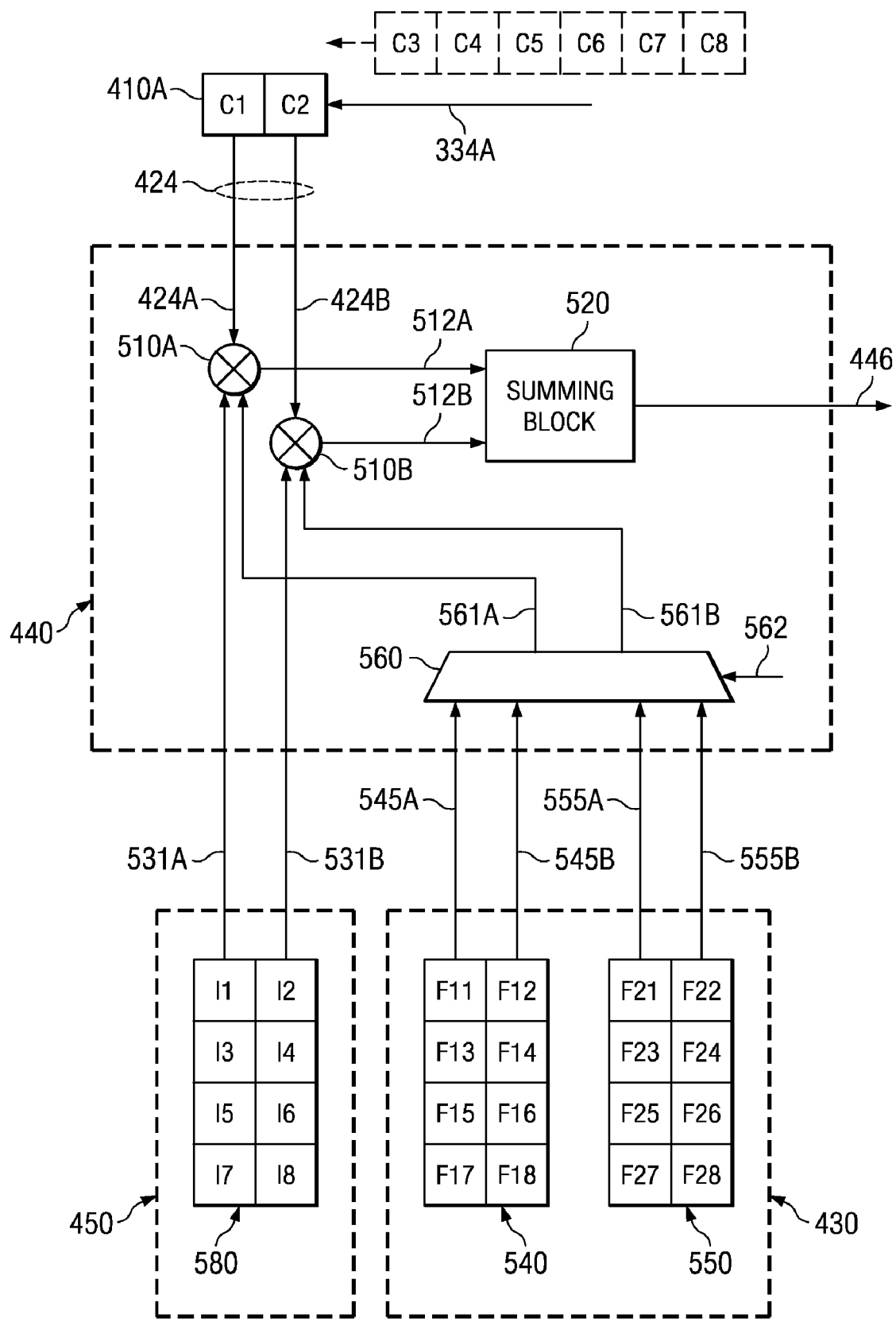
FIG. 5A is a diagram illustrating the manner in which correlation operations are performed by a channel in an embodiment.

FIG. 5A is a block diagram illustrating the manner in which correlation operations are performed by a channel in an embodiment. Correlator 440, code forming block 450, and local carrier generator 430 contained in channel 490-1 (FIG. 4), and buffer 410A (FIG. 4) are shown in FIG. 5A. For ease of description, it is assumed that the GNSS signal which channel 490-1 is configured by processor 350 to acquire and track, contains a code with a period of eight chips (bits), and is sampled at a rate of 1 sps. It is assumed, again to simplify description that only two carrier phases (two carrier Doppler hypotheses) are searched for.

Buffer 410A contains memory elements (each with a hardware support, e.g., in the form of transistors) which may be implemented as a shift register. The size (memory space) in buffer 410A equals two GNSS samples corresponding to ¼ of the period. It is noted that while a sample of a GNSS signal may, in general, contain multiple bits, it is assumed that each sample is represented by a single bit (i.e., either logic 0 or logic 1) to simplify the following description.

Samples representing a baseband GNSS signal (with a code period of 8chips) are received by buffer 410A via path 334A, with two samples (also equal to two bits in the example) being stored in buffer 410A at a time. Representing C1-C8 as the 8 samples (or 8 bits) obtained corresponding to one code period duration, FIG. 5A is shown with the first two samples C1 and C2 stored in buffer 410A (newer/later successive samples C3-C8 shown in dashed boxes in FIG. 5A, for clarity in the description below).

Buffer 410A provides the two stored samples on paths 424A and 424B (deemed to be contained in path 424) to multipliers 510A and 510B respectively. Hence, path 412A of FIG. 4 contains two separate paths, each providing the two samples stored in buffer 410A to bus 402, which in turn provides the two bits (in parallel) to MUX 420. MUX 420 provides the two chips on path 424. In FIG. 5A, buffer 410A is shown as directly providing the two stored samples directly on path 424 merely as an illustration.

Code forming block 450 is shown containing storage register(s) 580, with the register 580 having a size equal to and storing 8 chips/bits, I1-I8, representing the eight code chips of the GNSS signal to be acquired/tracked. Local carrier generator 430 is shown containing Doppler coefficients F11-F18 (labeled as 540) for one carrier phase to be searched for, and Doppler coefficients F21-F28 (labeled as 550) for the second carrier phase to be searched for. The labels 540 and 550 are also referred to in the description below as Doppler hypotheses.

Correlator 440 is shown containing multipliers 510A and 510B, summing block 520, and MUX 560. MUX 560 receives local carrier samples on paths 545A, 545B, 555A and 555B, and based on the value of control input 562, forwards either the carrier sample-pairs on paths 545A and 545B, or on paths 555A and 545B, onto paths 561A and 561B respectively.

Multiplier 510A receives a GNSS sample on path 424A, and multiplies the GNSS sample with a sample (local sample) representing a combination of a local code chip and a local carrier sample, received respectively on paths 531A and 561A. The combination of the local code chip and local carrier sample may be performed based on the specific type of GNSS signal sought to be processed (e.g., using XOR operation in the case of GPS). The combination operation and corresponding circuitry are not shown in FIG. 5A, but can be implemented using well known techniques.

Multiplier 510A provides the product of the GNSS sample and local sample on path 512A. Multiplier 510B provides, on path 512B, a product of a GNSS sample received on path 424B and a local sample representing the combination of a local code chip and carrier sample received respectively on paths 531B and 561B. Summing block 520 adds the products received on paths 512A and 512B to form a partial sum, and forwards the partial sum on path 446.

Figure 5B:
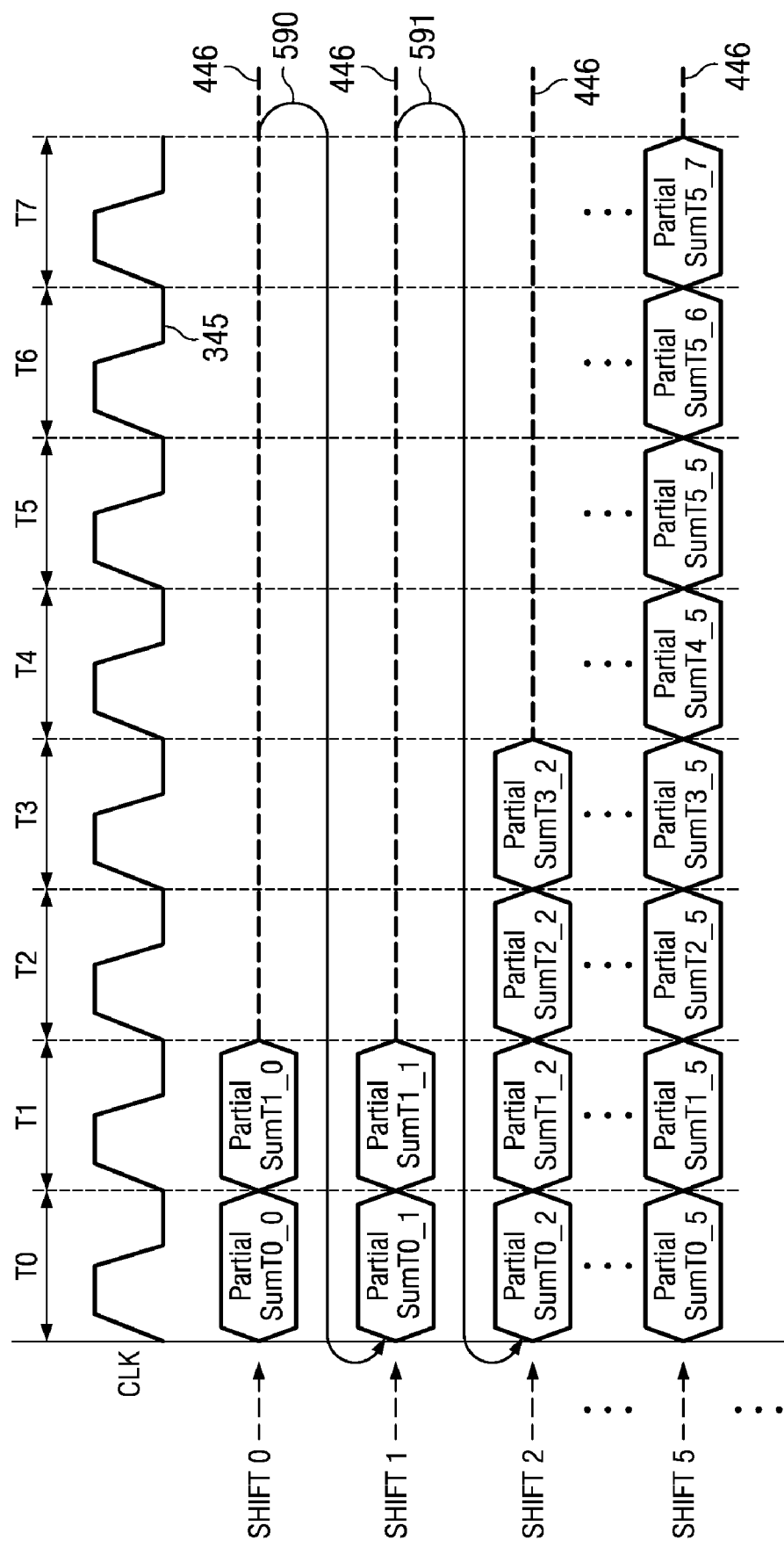
FIG. 5B is a timing diagram illustrating the operation of a channel in an embodiment.

The operations of the blocks of FIG. 5A in performing code phase and carrier phase searches are described with combined reference to the timing diagram of FIG. 5B and the correlation results table shown in FIG. 6. It is first noted that for the example of FIGS. 5A, 5B and 6, one complete (over one code period) correlation results for one code phase and one carrier phase (one Doppler hypothesis) search contains four partial sums (provided on path 446). Example correlation results for code phase C1 and Doppler hypothesis 540, as well as for code phase C8 and Doppler hypothesis 550 are respectively represented by equations 1 and 2 below:

$$\text{PhaseC1-Doppler540} = [I1.C1.F11 + I2.C2.F12] + \\ [I3.C3.F13 + I4.C4.F14] + [I5.C5.F15 + \\ I6.C6.F16] + [I7.C7.F17 + I8.C8.F18] \quad \text{Equation 1}$$

$$\text{PhaseC4-Doppler550} = [I1.C4.F21 + I2.C5.F22] + \\ [I3.C6.F23 + I4.C7.F24] + [I5.C8.F25 + \\ I6.C1.F26] + [I7.C2.F27 + I8.C3.F28] \quad \text{Equation 2}$$

In Equations 1 and 2, the terms within brackets, such as [I1.C1.F11+I2.C2.F12], represent partial sums provided on path 446. Each term contains two partial correlations, with each partial correlation result being obtained as noted above. For example, the partial correlation I1.C1.F11 of partial sum [I1.C1.F11+I2.C2.F12] is generated by multiplier 510A, by multiplying GNSS sample bit C1 (received on path 424A) with the local sample represented by the combination (I1.F11).

In the table of FIG. 6, column labeled "SHIFT" represents the number of GNSS sample-shifts that occur in buffer 410. SHIFT 0 represents a state (or time interval) when GNSS samples C1 and C2 are stored, SHIFT 1 represents a state when GNSS samples C2 and C3 are stored, with C1 having been shifted out (leftwards in FIG. 5A) and discarded, SHIFT 2 represents a state when GNSS samples C3 and C4 are stored, with C2 having been shifted out and discarded, and so on. Time intervals T0 through T7 represent intervals in which correlator 440 generates the partial sums corresponding to a SHIFT state, and shown in the corresponding columns T0-T7.

It may be appreciated that although time is shown in FIG. 5B only along the X axis, T0 through T7 of SHIFT 0 occur in forward chronological order, followed by T0 through T7 of SHIFT 1 (represented by arrow 590), then by T0 through T7 of SHIFT 2 (represented by 591), and so on. In the timing diagram of FIG. 5B, only the partial sums generated for SHIFT 0, SHIFT 1, SHIFT 2 and SHIFT 5 are shown, for conciseness.

Assuming that correlation operation start with samples C1 and C2 stored in buffer 410A (SHIFT 0 state), correlator 440 generates, in time interval T0 (of SHIFT 0), partial sumT0_0 ([I1.C1.F11+I2.C2.F12]) for code phase C1 and Doppler hypothesis 540, and partial sumT1_0, ([I1.C1.F21+I2.C2.F22]) for code phase C1 and Doppler hypothesis 550. The two partial sums are shown along row SHIFT 0, and under columns T0 and T1 respectively. The other partial sums shown in FIGS. 5B and 6 are generated in the corresponding time intervals of the corresponding SHIFT state, as may be verified.

The table of FIG. 6 shows the partial sums for one complete code phase search (for all possible eight code phases) and covering two Doppler hypotheses, with partial sum [I7.C6.F27+I8.C7.F28] being the last partial sum generated. In general, all the partial sums of FIG. 6 are provided to processor 350 (via storages 470 and 480), which processes the sums in a known way for locking, tracking and/or data recovery purposes. As noted above, the position can be determined in a known way (typically based on data from 3 or more satellites) once the data is recovered from the corresponding satellites.

Thus, assuming the GNSS signal searched for is received and has a sufficiently high signal-to-noise ratio, the sum of a corresponding sequence of four of the partial sums (e.g., as given in equation 1 or 2, the corresponding partial sums being shown circled in FIG. 6) may indicate that the GNSS signal has been locked onto (acquired). Otherwise, correlator 440 may repeat the correlations described above till signal lock is achieved, or a command from processor 350 to search for a different GNSS signal is received.

Assuming a lock is obtained, channel 490-1 may be provided with samples from buffer 410B (4-samples-wide storage) to continue to track the acquired GNSS signal. Other channels may be configured to perform correlations to acquire/track GNSS signals in a similar manner to that described above.

The description above is provided assuming code period of 8 chips, and only two Doppler hypotheses merely to serve as an illustration. It may be appreciated that the technique may be extended for real world GNSS signals. For example, to acquire and track a GPS C/A L1 type GNSS signal, code forming block 450 may internally store 1023 local code chips, and local carrier generator 430 may store more than two sets of Doppler coefficients. In general, the number of sets of Doppler coefficients may be selected depending on whether estimates of the position of receiver 110 and the local time are available a priori (e.g., whether receiver 110 is in cold start, warm start, hot start modes, etc.).

It may be observed from the description above that a complete correlation is obtained by accumulating partial results (which may be stored in coherent sum storage 470 or non-coherent sum storage 480) that are 'spread across' a code period.

Further, it may also be observed that all possible (or desired) partial correlation sums may be generated (e.g., for all code phases plus desired Doppler hypotheses) with the samples stored in buffer 410A (or the other buffers) before partial sums are generated with a next set of GNSS samples. As an illustration, partial sums corresponding to all eight local codes and both Doppler hypotheses 540 and 550 are generated in cycles T0-T8 of SHIFT 5 (row 5 in FIG. 6), using samples C6 and C7 in buffer 410A.

Subsequently, partial sums corresponding to all eight local codes and both Doppler hypotheses 540 and 550 are generated in cycles T0-T8 of SHIFT 6 (row 6 in FIG. 6), using samples C7 and C8 in buffer 410A. As a result, multiple code phase searches as well as Doppler hypotheses may be performed to obtain at least partial results (which may at a later time instance be combined) in a time-efficient manner.

As another benefit of the techniques illustrated with respect to FIG. 5A, 5B and 6, degradations in correlation sums resulting potentially due to bit-flips occurring in the received GNSS samples are minimized or eliminated.

The frequency of operation (frequency of clock 345Clk) required is expressed by the following formula:

$$f = (M*L*S/W)*Cf \quad \text{Equation 3}$$

wherein, f is the required frequency for clock 345Clk,

M is the number of Doppler hypotheses,

L is the number of symbols or chips in one code period of a GNSS signal desired to be acquired/tracked, W is the number of correlation products generated in one clock cycle of clock 345Clk, and also corresponds to the number of multipliers similar to 510A and 510B provided in hardware (along with corresponding input connections), S is the number of samples of the GNSS signal generated per chip or symbol, and Cf is the chipping or symbol frequency of the GNSS signal.

Thus, for acquisition/tracking of GPS C/A signals at L1 band, with S (of equation 3) equal to 2 sps, one Doppler hypothesis (M=1), and W equaling 66, a required frequency for 345Clk is (1023*2/66*1.023) Mega Hertz, i.e., 31.71 MHz. The storage size of buffer 410A for such a scenario is 132 samples (S*W), rather than 2046 samples (1023*2) if the entire code period worth of samples were instead stored. It may be appreciated that by reducing the code phase uncertainty or by increasing the operational frequency, multiple Doppler searches may be performed as well.

For example, employing the same 31.71 MHz operational frequency, two Doppler searches and approximately 512 chip code uncertainty can be searched for. The example numbers provided above are intended merely to be illustrative, and other values can be used depending on the specific requirements and implementation scenarios.

It is further noted that the number of Doppler coefficients can be reduced. As an illustration, for a Doppler uncertainty of +6 KHz, carrier phase may be assumed to remain constant for a predetermined number of GNSS samples, with a corresponding acceptable signal-to-noise ratio loss. For example, a 6 KHz Doppler changes carrier phase by less than 23 degrees for 11 chip period. Therefore, storage for Doppler coefficients can be reduced by quantizing the phase values to 45 degrees. For W equaling 66, as in the example above, such quantization necessitates only six coefficients per 66-chip duration for one Doppler hypothesis. Therefore, storage for only (2×6×M) Doppler coefficients is needed instead of 1023/11×M coefficients.

The approach described above requires storage elements to store all local samples, (local code samples within code forming block 450 and Doppler coefficients within local carrier generator 430). Since one set of local samples needs to be stored for each of channels 490-1 through 490-N, total storage area for the local samples may be unacceptably high, in some implementation scenarios. According to another aspect of the present invention, in addition to reduced storage area for storing GNSS samples, the storage area for storing local samples is also reduced. An embodiment illustrating such features is described next.

6. Reducing Storage Area for Local Samples

Figure 7:
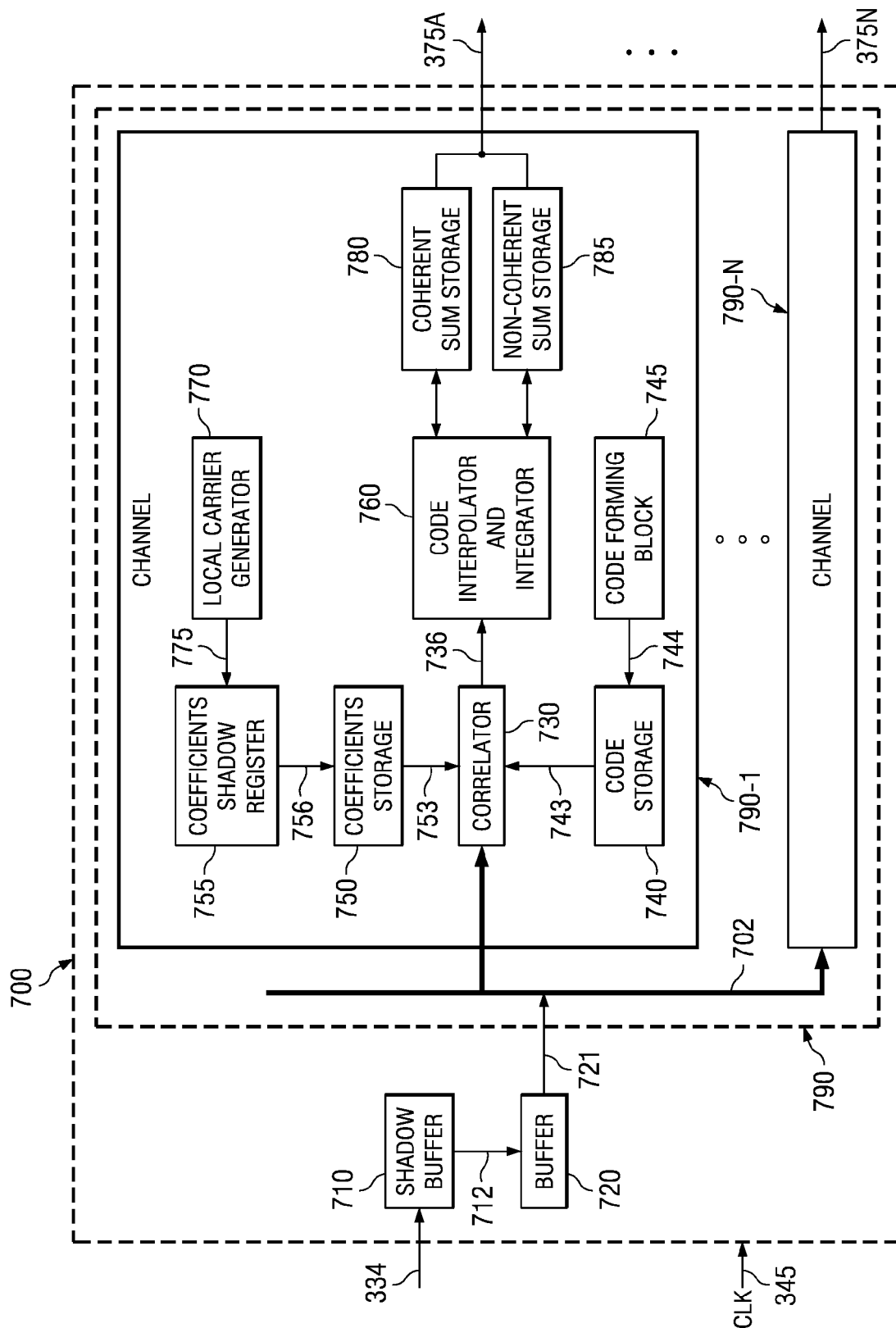
FIG. 7 is a block diagram of a baseband processing block in an alternative embodiment.

FIG. 7 is a block diagram of a baseband processing block in an embodiment. As described below, the approaches implemented operate to reduce storage size for local samples as well as received GNSS samples. Baseband processing block 700, which can be implemented in place of baseband processing block 340 of FIG. 3, is shown containing shadow buffer 710, buffer 720, and N-channel correlation block (790) containing channels 790-1 through 790-N, and bus 702. The internal details of only channel 790-1 is shown, and channels 790-2 through 790-N may be implemented in a similar manner.

Channel 790-1 is shown containing correlator 730, code storage 740, code forming block 745, coefficients storage 750, coefficients shadow register 755, code interpolator and integrator 760, local carrier generator 770, coherent sum storage 780 and non-coherent sum storage 785. The operations of the various blocks of baseband processing block 700 may be controlled by clock 345Clk.

Code forming block 745, local carrier generator 770, code interpolator and integrator 760, coherent sum storage 780 and non-coherent sum storage 480 operate similar to code forming block 450, local carrier generator 430, code interpolator and integrator 460, coherent sum storage 470 and non-coherent sum storage 480 of FIG. 4 respectively, and the description of their operation is not repeated in the interest of conciseness.

Each of shadow buffer 710 and buffer 720 is implemented to have a storage size less than one code period worth of samples corresponding to the type of GNSS signal desired to be acquired/tracked. It may be observed that the combination of 710/720 corresponds to one of the buffers 410A-410E.

Shadow buffer 710 stores GNSS samples received on path 334 (for example, in serial form). When shadow buffer 710 is full, control circuitry (not shown) causes the stored samples (which may be viewed as one window of GNSS samples ('window samples') with respect to a complete code period) to be transferred to buffer 720. Shadow buffer 710 receives newer/later GNSS samples, while channels 790-1 through 790-N operate to process the samples stored in buffer 720 (and received via path 721 and bus 702), till shadow buffer 710 is filled again, and the newer samples transferred to buffer 720.

Correlator 730 combines local code samples with corresponding local carrier samples received on paths 743 and 753 respectively to generate a local signal, and correlates the local signal with the baseband GNSS signal (samples) received on bus 702. Correlator 730 provides the product on path 736.

Code forming block 745 provides local code samples on path 744. Code storage 740 is implemented with a size less than one code period worth of local code samples. Local carrier generator 770 provides carrier samples (Doppler coefficients) on path 775. Coefficients shadow register 755 stores the samples received on path 775. When coefficients shadow register 755 is full, control circuitry (not shown) causes the stored carrier samples to be transferred to coefficients storage 750 via path 756. Each of coefficients shadow register 755 and coefficients storage 750 is implemented with a storage size less than a size required to store a complete set of coefficients required for one Doppler hypothesis covering one code period. Coefficients shadow register 755 receives a next set of carrier samples from local carrier generator 770 while correlator 730 operates using the samples stored in coefficients storage 750.

Due to the reduced storage size required for storing code samples and carrier samples, in addition to the reduced size of buffer 720, overall storage area in baseband processing block 700 is reduced. An example implementation illustrating the structure and techniques described above with respect to FIG. 7 is provided next with reference to FIG. 8.

Figure 8:
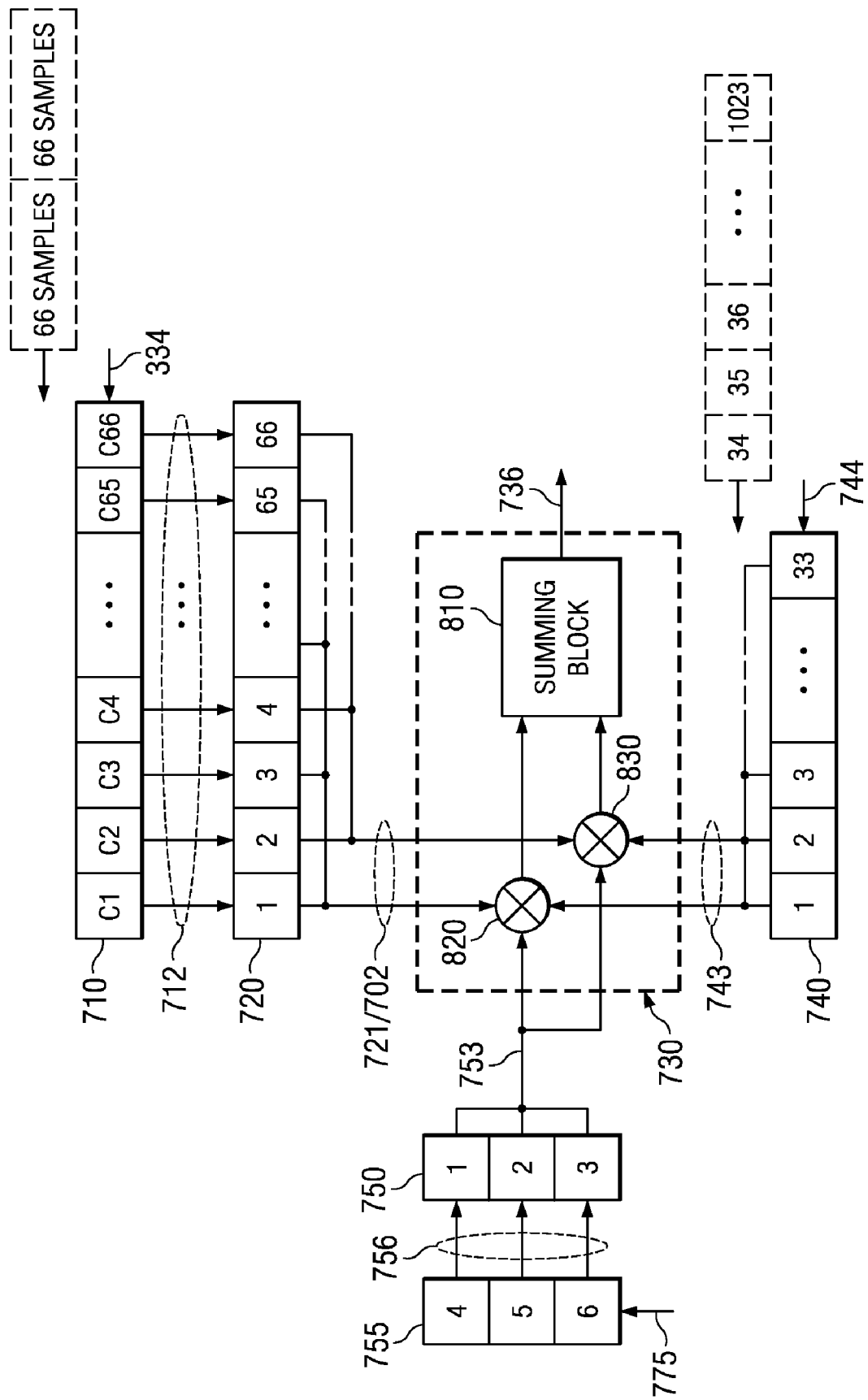
FIG. 8 is a diagram illustrating the manner in which correlation operations are performed by a channel in an alternative embodiment.

The details of the blocks shown in FIG. 8 are provided assuming that a GPS signal is to be acquired/tracked in channel 790-1. It is assumed that each of shadow buffer 710 and buffer 720 are implemented with a storage size equal to sixty six samples (one window in this example) of a GPS signal sampled at 2 sps. The sixty six storage locations in shadow buffer 710 are labeled C1-C66, while those in buffer 720 are labeled 1-66. It is noted that one code period of a GPS C/A L1 signal sampled at 2 sps contains 2046 samples. Incoming sets of sixty six samples to be stored in shadow buffer 710 are shown in dashed boxes in FIG. 8, to lend clarity in the description below.

In the embodiment of FIG. 8, code storage 740 is implemented with a size equal to store thirty three chips (bits) of a local GPS code, and each of coefficients shadow register 755 and coefficients storage 750 is implemented to store 3 carrier samples. The number of bits used to represent each sample is based, generally, on the level of accuracy desired. Each of multipliers 820 and 830 in correlator 730 is assumed to be implemented to perform thirty three multiply operations simultaneously, and may each contain thirty three multipliers internally.

Multiplier 820 receives in parallel (simultaneously), samples stored in thirty three odd-numbered storage locations (1, 3, 5, etc. in FIG. 8) of buffer 720, and multiplier 830 receives in parallel, thirty three samples from even-numbered locations of buffer 720. Although shown as separate inputs to multipliers 820 and 830, it is assumed that correlator 730 contains corresponding circuitry (not shown) to combine code samples on path 743 with corresponding carrier samples on path 753, and to provide the combined result to the corresponding portions of multipliers 820 and 830.

In operation, code storage 740 provides thirty three code bits 'currently' stored in it on path 743. The thirty three code bits are combined using XOR operation with corresponding ones of carrier samples provided by coefficients storage 750 on path 753. Thus, the first carrier sample is combined with each of the first 11 code bits, the second carrier sample is combined with each of the next 11 code bits, and the third sample with the last 11 code bits. The thirty three local samples thus obtained are provided to the corresponding ones of the thirty three multipliers in each of multiplier 820 and 830. Multipliers 820 and 830 provide the results of the multiplication (sixty six products corresponding to thirty three local code period duration) to summing block 810. Summing block 810 adds the sixty six products to provide a partial sum on path 736.

The operations noted above are repeated with a next code bit shifted into code storage 740 (e.g., code bits 2 through 34, corresponding to a second partial sum), till the last ($1023^{rd}$) code bit is shifted into code storage 740, i.e., a total of 990 (1023-33) iterations, each of which may be viewed as an 'iteration window'. It is noted that for every successive iteration, a new set of generated carrier samples is provided to coefficients storage 750 from coefficients shadow register 755 (which in turn is provided that carrier samples by local carrier generator 770.

Each of the partial 990 partial sums is stored in either coherent sum storage 780 or non-coherent sum storage 785, and the generation of one set of 990 partial sums represents one partial code phase search and one partial Doppler hypothesis performed with the available 'current' sixty six GNSS samples in buffer 720. The above operations may be repeated with further sets of sixty six GNSS samples till one complete code phase search and one complete Doppler hypothesis is over.

A next set of iterations may then be performed for a next Doppler hypothesis, and the operations maybe continued throughout the acquire and track phases of operations. It is noted that processor 350 (FIG. 3) may perform one complete correlation covering one code phase and one Doppler hypothesis (1023*2=2046 correlation products in the example) by adding the corresponding partial correlation results (partial sums) from corresponding iteration windows.

It may be appreciated that, in addition to the "less than one code period worth of samples" storage size in buffer 710, the storage size for local code and carrier samples is less than that in the implementation described with respect to FIGS. 4 and 5A. For example, while in the implementation of FIGS. 4 and 5A code storage 450 is required to be large enough to store 1023 code bits (for GPS) and eight carrier samples for each Doppler hypothesis, in the embodiment described with respect to of FIGS. 7 and 8, the total storage requirement for code as well as carrier samples is only thirty three bits for code storage 740 and three samples for coefficients storage 750 (ignoring the storage area due to coefficients shadow register 755).

The savings in area may be particularly significant when the total number of channels is large, and/or when the code period length is large.

Figure 9:
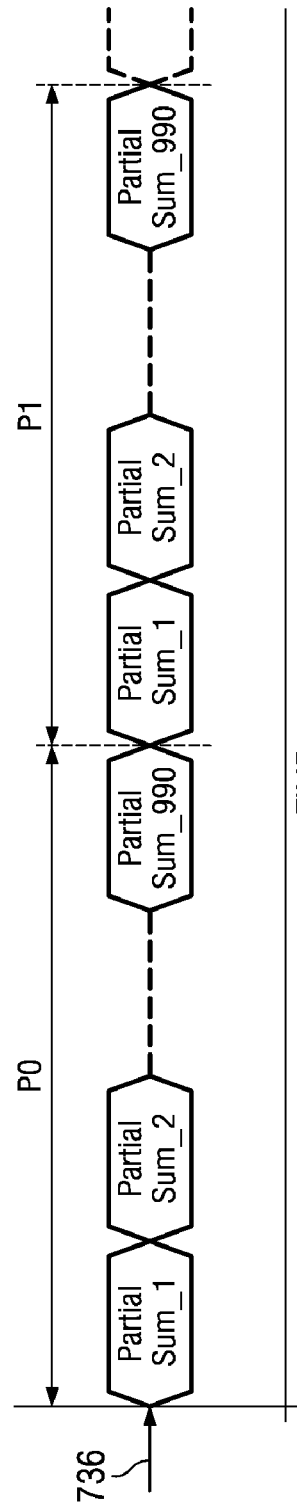
FIG. 9 is a timing diagram illustrating the operation of a channel in an alternative embodiment.

FIG. 9 is a timing diagram illustrating the operations noted above. Time interval P0 represents a duration in which partial sums for all 1023 local code phases and one (partial) Doppler hypothesis are generated using a set of sixty six GPS samples stored in buffer 720. In an immediately subsequent interval P1, partial sums for all 1023 local code phases and a next partial portion of the same Doppler hypothesis (as in P1) are generated using a next set of sixty six GPS samples received and stored in buffer 720. Further sets of partial sums corresponding to further sets of sixty six GPS samples are similarly generated.

It may be appreciated that availability of GNSS samples in buffer 720 for the duration of thirty three code chips of a GPS signal (in the example) provides sufficient time for generation (in code forming block 745 and local carrier generator 770 respectively) of local code and carrier samples dynamically ('on the fly'). Hence, all the code and carrier samples do not need to be generated and stored before commencement of processing of a GNSS signal, thereby reducing storage size of code storage 740 as well as coefficients storage 750. The respective storage sizes of buffer 720, shadow buffer 710, code storage 740, coefficients storage 750, coefficients shadow register 755 and the combinational logic required to be implemented in correlator 730 are inversely proportional to the size of a 'window' of stored GNSS samples (sixty six in the example). The sizes may be implemented to be larger or smaller than in the example described above based on implementation or environment-specific requirements.

It is also noted that by increasing the frequency of clock 345Clk multiple (partial) Doppler hypotheses may be performed with a same set of 'window samples' in other embodiments. Increasing the frequency of clock 345Clk can also enable a same channel to be used for acquiring/tracking more than one GNSS signal in a time multiplexed manner. In some other embodiments, fewer than a complete local code phase set (less than 1023 in the example) may be used for correlations with each set 'window samples'.

Thus, several aspects of the present invention enable a GNSS receiver to be implemented with reduced storage requirements for storing GNSS samples as well as for storing local code and carrier samples.

References throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. A Global Navigation Satellite System (GNSS) receiver to process a GNSS signal, said GNSS signal being generated in a transmitter by modulating a signal carrier with a combined value, wherein said combined value is generated by combining a corresponding one of a set of different codes with a corresponding data value to be transmitted in the corresponding transmitter, said GNSS receiver comprising:
an analog to digital converter (ADC) to receive said GNSS signal and to generate a sequence of samples respectively representing a strength of said GNSS signal at corresponding time instances;
a buffer to store said sequence of samples;
a correlator to examine samples stored in said buffer to generate a partial correlation result indicating a similarity between a portion of a local signal and a portion of said GNSS signal represented by said set of samples, said local signal being generated by modulating a local carrier signal with a local code equaling one of said set of different codes; and
a processor to examine a plurality of partial correlation results to perform at least one of a code phase search and a carrier frequency search with respect to said GNSS signal,
wherein said buffer is designed to store fewer than a number of samples spanning one code period examined by said correlator.

2. The GNSS receiver of claim 1, wherein said local code contains a first number of bits for said code period, said GNSS receiver further comprising:
a code storage having memory space to store less than said first number of bits of said local code.

3. The GNSS receiver of claim 2, wherein said local carrier signal contains a second number of samples for said code period, said GNSS receiver further comprising:
a carrier storage having memory space to store less than said second number of samples,
said correlator being coupled to retrieve the samples stored in said carrier storage and to said code storage to retrieve code bits stored in said code storage,
said correlator combining the retrieved samples and code bits to generate said local signal.

4. The GNSS receiver of claim 3, further comprising:
a code forming block to dynamically generate each portion of said local code before the portion of the local code is used by said correlator, said code forming block to store the generated portion of the local code in said code storage; and
a local carrier generator to dynamically generate each portion of said second number of samples before the portion of the samples is used by said correlator, said local carrier generator to store the generated portion of the samples in said carrier storage.

5. The GNSS receiver of claim 4, further comprising:
a second buffer of the same size as said buffer, said second buffer to store samples while said buffer provides samples to said plurality of correlators,
said second buffer transferring stored samples to said buffer once said second buffer is filled with samples.

6. The GNSS receiver of claim 1, further comprising:

a storage buffer, wherein said correlator is designed to perform a plurality of searches for Doppler and code phase during an acquisition phase, wherein said correlator is designed to generate a plurality of partial sums, each of said plurality of partial sums corresponding to one of said plurality of searches, said correlator being designed to generate all partial sums in each of said plurality of partial sums using the currently stored set of samples in said buffer before a next sample is stored in said buffer.

7. The GNSS receiver of claim 1, further comprising a plurality of buffers and a plurality of correlators, each of said plurality of correlators being contained in a corresponding one of a plurality of channels, each of said plurality of buffers corresponding to a corresponding combination one of a plurality of GNSS signal types said GNSS receiver is designed to process, and one of tracking and acquisition modes, each of said correlators being designed to process samples stored in one of said plurality of buffers for match with the corresponding combination of the GNSS signal type and the mode, wherein samples stored in each of said plurality of buffers is available to each one of said plurality of correlators.

8. The GNSS receiver of claim 7, further comprising a decimation block to receive said sequence of samples from said ADC and to provide a decimation operation according to a decimation level required for said correlator to process said GNSS signal, wherein an output of said decimation operation is provided to said correlator.

9. The GNSS receiver of claim 1, wherein said correlator is clocked by a clock signal having a frequency greater than or equal to f, wherein f is computed according to:

$$f=(M*L*S/W)*Cf$$

wherein, f is the required frequency of said clock signal,

M is the number of Doppler hypotheses to be performed by said correlator with respect to said GNSS signal, L is the number of symbols or chips in one code period of said GNSS signal, W is the number of multipliers contained in said correlator and operating in parallel, S is the number of samples of the GNSS signal generated per chip by said ADC, and Cf is the chipping or symbol frequency of said GNSS signal.

10. The GNSS receiver of claim 1, further comprising:

an antenna to receive said GNSS signal; and a front end processing block to receive said GNSS signal from said antenna and to amplify, down-convert and filter said GNSS signal before providing said GNSS signal to said ADC.

11. The GNSS receiver of claim 1, wherein said GNSS signal corresponds to one of Global Positioning System (GPS) signal, Galileo Signal, and GLONASS signal.

12. A Global Navigation Satellite System (GNSS) receiver to process a GNSS signal, said GNSS signal being generated in a transmitter by modulating a signal carrier with a combined value, wherein said combined value is generated by combining a corresponding one of a set of different codes with a corresponding data value to be transmitted in the corresponding transmitter, said set of different codes being characterized by a code period, said GNSS receiver comprising:

an analog to digital converter (ADC) to receive said GNSS signal and to generate a sequence of samples respectively representing a strength of said GNSS signal at corresponding time instances;

a buffer to store said sequence of samples;

a correlator to examine samples stored in said buffer and to generate a partial correlation result indicating a similarity between a portion of a local signal and a portion of said GNSS signal represented by said sequence of samples, said local signal being generated by modulating a local carrier signal with a local code equaling one of said set of different codes;

a code storage having memory space to store less than a first number of bits, wherein said local code contains a first number of bits for said code period; and a processor to examine a plurality of partial correlation results to perform code phase and carrier frequency searches with respect to said GNSS signal.

13. The GNSS receiver of claim 12, wherein said local carrier signal contains a second number of samples for said code period, said GNSS receiver further comprising:

a carrier storage having memory space to store less than said second number of samples, said correlator being coupled to retrieve the samples stored in said carrier storage and to said code storage to retrieve code bits stored in said code storage, said correlator combining the retrieved samples and code bits to generate said local signal.

14. The GNSS receiver of claim 13, further comprising:

a code forming block to dynamically generate each portion of said local code before the portion of the local code is used by said correlator, said code forming block to store the generated portion of the local code in said code storage; and a local carrier generator to dynamically generate each portion of said second number of samples before the portion of the samples is used by said correlator, said local carrier generator to store the generated portion of the samples in said carrier storage.

15. The GNSS receiver of claim 14, further comprising:

a second buffer of the same size as said buffer, said second buffer to store samples while said buffer provides samples to a plurality of correlators, said second buffer transferring stored samples to said buffer once said second buffer is filled with samples, wherein said correlator is comprised in said plurality of correlators.

16. The GNSS receiver of claim 12, wherein said buffer is designed to store fewer than a number of samples spanning one code period of said GNSS signal.

17. The GNSS receiver of claim 12, further comprising:

a storage component, wherein said correlator is designed to perform a plurality of searches for Doppler and code phase during an acquisition phase, wherein said correlator is designed to generate a plurality of partial sums, each of said plurality of partial sums corresponding to one of said plurality of searches, said correlator being designed to generate all partial sums in each of said plurality of partial sums using the currently stored set of samples in said buffer before a next sample is stored in said buffer.

18. The GNSS receiver of claim 12, further comprising a plurality of buffers and a plurality of correlators, each of said plurality of buffers corresponding to a corresponding combination one of a plurality of GNSS signal types said GNSS receiver is designed to process, and one of tracking and acquisition modes, each of said correlators being designed to process samples stored in one of said plurality of buffers for match with the corresponding combination of the GNSS signal type and the mode.

19. The GNSS receiver of claim 12, further comprising:
an antenna to receive said GNSS signal; and
a front end processing block to receive said GNSS signal from said antenna and to amplify, down-convert and filter said GNSS signal before providing said GNSS signal to said ADC.

* * * * *